(12) United States Patent
Kang et al.

(10) Patent No.: US 12,500,037 B2
(45) Date of Patent: Dec. 16, 2025

(54) MULTILAYER ELECTRONIC COMPONENT

(71) Applicant: SAMSUNG ELECTRO-MECHANICS CO., LTD., Suwon-si (KR)

(72) Inventors: Sim Chung Kang, Suwon-si (KR); Jong Ho Lee, Suwon-si (KR); Eun Jung Lee, Suwon-si (KR); Hyun Sik Chae, Suwon-si (KR); Sun Mi Kim, Suwon-si (KR); Dae Jin Shim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 18/384,784

(22) Filed: Oct. 27, 2023

(65) Prior Publication Data

US 2024/0203661 A1    Jun. 20, 2024

(30) Foreign Application Priority Data

Dec. 14, 2022   (KR) .................. 10-2022-0174741

(51) Int. Cl.
*H01G 4/30* (2006.01)
*H01G 4/005* (2006.01)
*H01G 4/12* (2006.01)
*H01G 4/224* (2006.01)

(52) U.S. Cl.
CPC .............. *H01G 4/30* (2013.01); *H01G 4/005* (2013.01); *H01G 4/1227* (2013.01); *H01G 4/224* (2013.01)

(58) Field of Classification Search
None
See application file for complete search history.

(56) References Cited

U.S. PATENT DOCUMENTS

| | | | | |
|---|---|---|---|---|
| 11,270,844 | B2* | 3/2022 | Lee ................. | H01G 4/012 |
| 11,929,206 | B2* | 3/2024 | Jung ................ | H01G 4/30 |
| 11,961,679 | B2* | 4/2024 | Kim ................. | H01G 4/1218 |
| 2020/0105468 | A1* | 4/2020 | Hashimoto .......... | H01G 4/005 |
| 2020/0126724 | A1* | 4/2020 | Takagi ............. | H01G 4/30 |
| 2021/0074479 | A1* | 3/2021 | Lee ................. | H01G 4/248 |
| 2022/0139632 | A1* | 5/2022 | Kim ................. | H01G 4/30 361/321.4 |
| 2022/0148811 | A1* | 5/2022 | Kwon ............... | H01G 4/008 |
| 2022/0319775 | A1* | 10/2022 | Kato ............... | H01G 4/008 |
| 2024/0203661 | A1* | 6/2024 | Kang ............... | H01G 4/1227 |

(Continued)

FOREIGN PATENT DOCUMENTS

| KR | 10-2021-0030755 A | 3/2021 |
|---|---|---|
| KR | 10-2022-0060347 A | 5/2022 |

*Primary Examiner* — Dion R. Ferguson
(74) *Attorney, Agent, or Firm* — MORGAN, LEWIS & BOCKIUS LLP (57) ABSTRACT

A multilayer electronic component includes a body including a dielectric layer and internal electrodes alternately disposed with the dielectric layer in a first direction; external electrodes disposed on the body; and side margin portions disposed on the body, wherein an average content of Sn included in the side margin portion is 0.1 mol % or more and 4.0 mol % or less, wherein a Ba/Ti ratio of the side margin portion is greater than 1.040 and less than 1.070, and wherein an average size of a plurality of dielectric grains included in the side margin portion satisfies 100 nm or more and 290 nm or less.

19 Claims, 6 Drawing Sheets

(56) References Cited

U.S. PATENT DOCUMENTS

2024/0212934 A1* 6/2024 Kang ................. B32B 18/00
2024/0222010 A1* 7/2024 Lee .................. H01G 4/1227
2024/0312713 A1* 9/2024 Lee .................. H01G 4/008
2024/0379292 A1* 11/2024 Chae ................. H01G 4/232

* cited by examiner

MULTILAYER ELECTRONIC COMPONENT

CROSS-REFERENCE TO RELATED APPLICATION (S)

This application claims benefit of priority to Korean Patent Application No. 10-2022-0174741 filed on Dec. 14, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer electronic component (MLCC), a multilayer electronic component, may be a chip-type condenser mounted on the printed circuit boards of various types of electronic products such as imaging devices such as a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output, demand for miniaturization and high capacitance multilayer ceramic capacitors has increased.

To meet the demand for miniaturization and high capacitance of a multilayer electronic component, the thickness of the internal electrode and the dielectric layer may need to be decreased and the number of layers may need to be increased. As the number of layers increases, however, a step difference may be formed in the width direction of the internal electrode. Such a step difference may degrade high-temperature reliability and withstand voltage properties of the multilayer ceramic capacitor. To overcome this issue, a side margin portion may be formed by attaching a margin sheet in the width direction of the internal electrode. Properties of the multilayer ceramic capacitor may improve by controlling the types and contents of materials included in a margin sheet, a binder, and a dispersant, such that that an optimal design of the side margin portion may be important.

SUMMARY

An example embodiment of the present disclosure is to provide a multilayer electronic component having improved BDV properties, mechanical properties, and moisture resistance reliability.

According to an example embodiment of the present disclosure, a multilayer electronic component includes a body including dielectric layers and internal electrodes alternately disposed with at least one of the dielectric layers in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; external electrodes disposed on the third and fourth surfaces and connected to the internal electrodes; and a side margin portion disposed on the fifth and sixth surfaces, wherein an average content of Sn included in the side margin portion is 0.1 mol % or more and 4.0 mol % or less, wherein a Ba/Ti ratio of the side margin portion is greater than 1.040 and less than 1.070, and wherein an average size of a plurality of dielectric grains included in the side margin portion satisfies 100 nm or more and 290 nm or less.

According to an example embodiment of the present disclosure, a multilayer electronic component includes a body including dielectric layers and internal electrodes alternately disposed with at least one of the dielectric layers in a first direction; external electrodes disposed on the body and connected to the internal electrodes; and a side margin portion disposed on surfaces of the body opposing each other in a direction perpendicular to the first direction, the side margin portion includes a first region adjacent to the body and a second region adjacent to an outer surface of the side margin portion, and wherein an average content of Sn included in the first region is 0.1 mol % or more and less than 0.5 mol %, and an average content of Sn included in the second region is 0.5 mol % or more and 1.0 mol % or less.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

Figure 1:
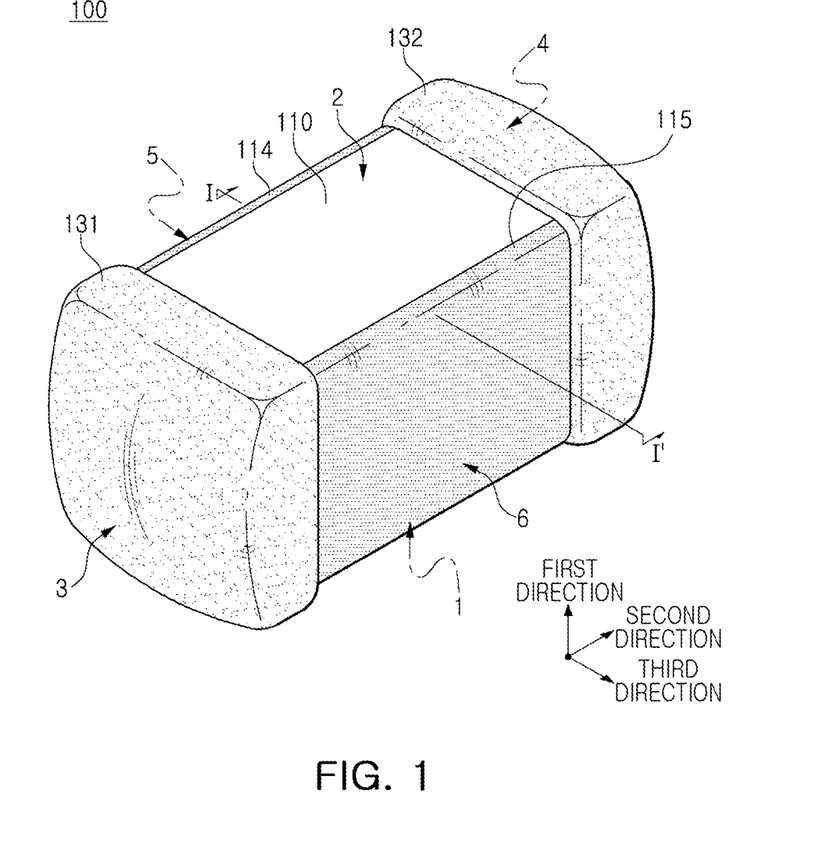
FIG. 1 is a perspective diagram illustrating a multilayer electronic component according to an example embodiment of the present disclosure.

FIG. 1 is a perspective diagram illustrating a multilayer electronic component according to an example embodiment.

Figure 2:
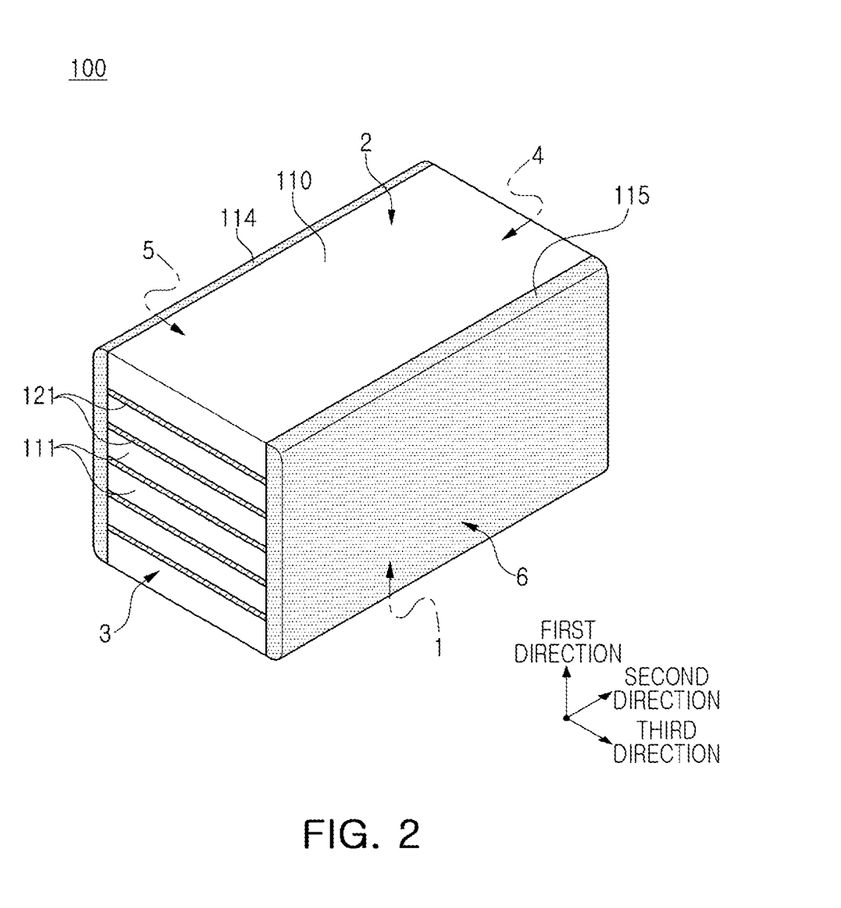
FIG. 2 is a diagram illustrating exteriors of a side margin portion and a body in FIG. 1.

FIG. 2 is a diagram illustrating exteriors of a side margin portion and a body in FIG. 1.

Figure 3:
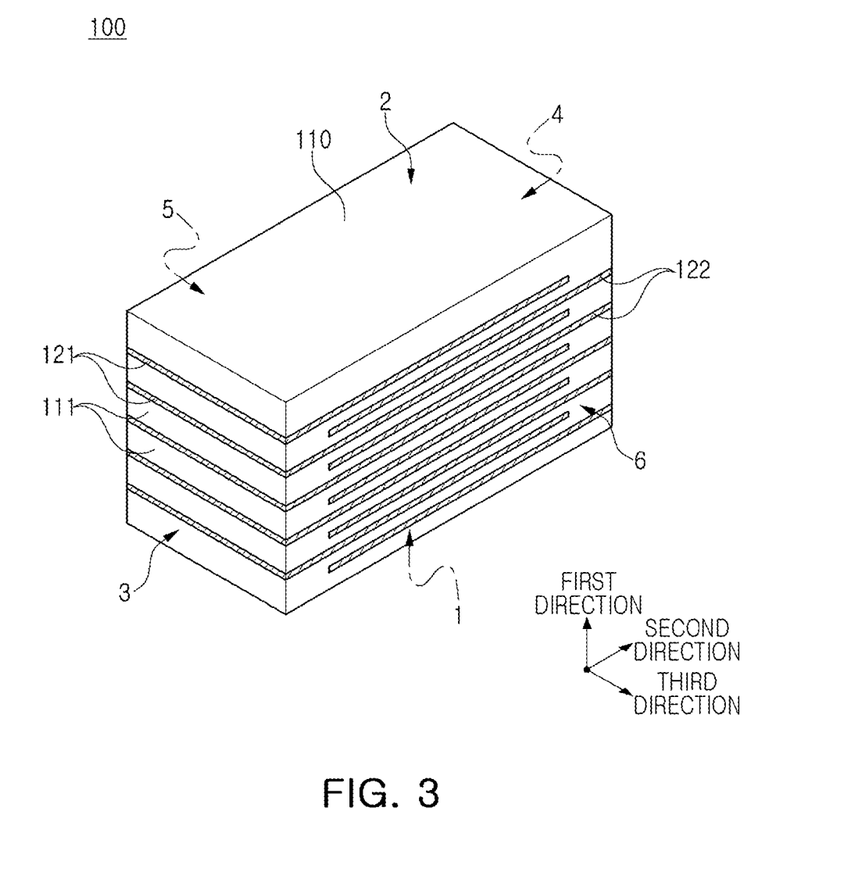
FIG. 3 is a diagram illustrating an exterior of a body in FIG. 2.

FIG. 3 is a diagram illustrating an exterior of a body in FIG. 2.

Figure 4:
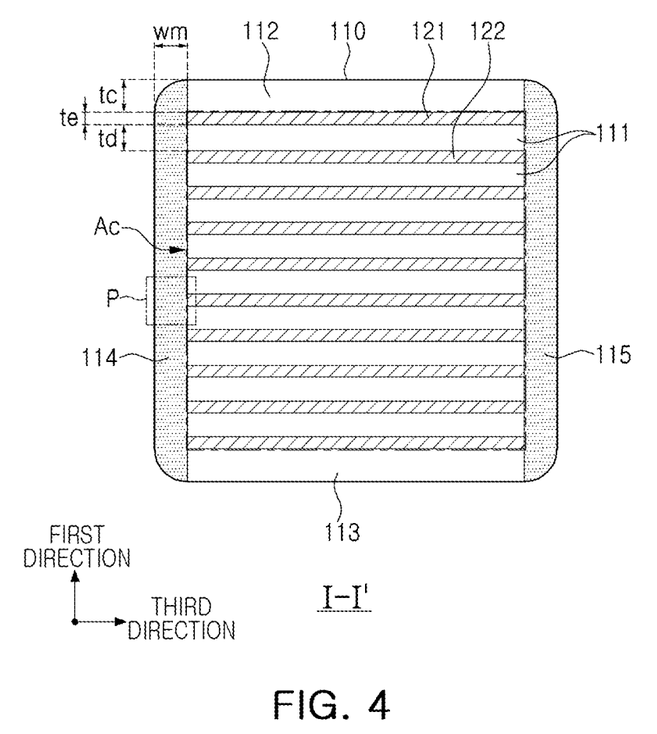
FIG. 4 is a cross-sectional diagram taken along line I-I' in FIG. 1.

FIG. 4 is a cross-sectional diagram taken along line I-I' in FIG. 1.

Figure 5:
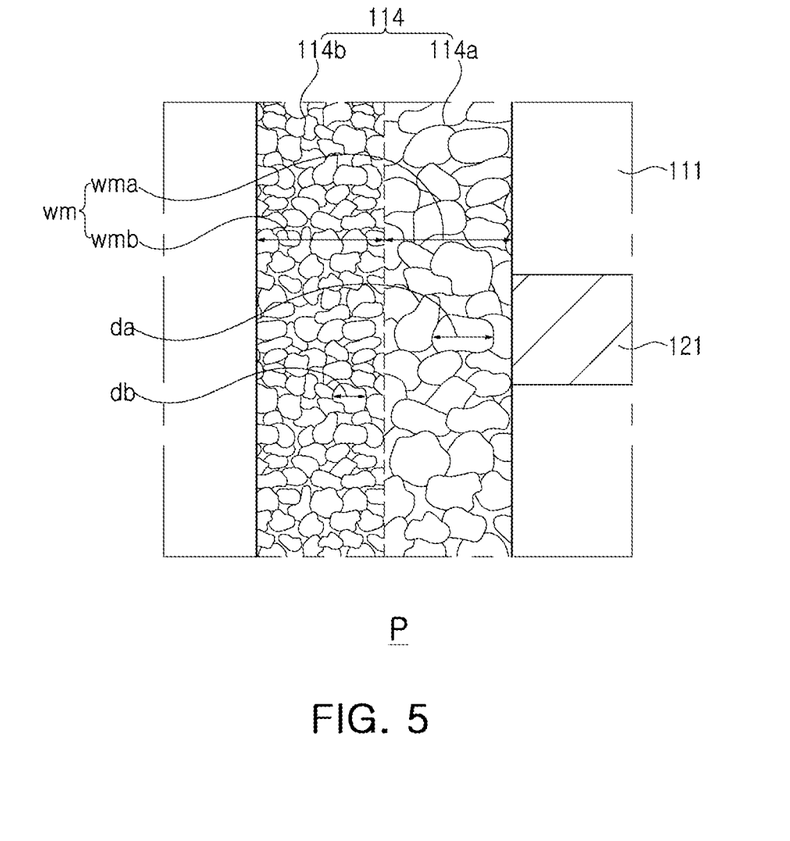
FIG. 5 is an enlarged diagram illustrating region P in FIG. 4 according to an example embodiment of the present disclosure.

FIG. 5 is an enlarged diagram illustrating region P in FIG. 4 according to an example embodiment.

Figure 6:
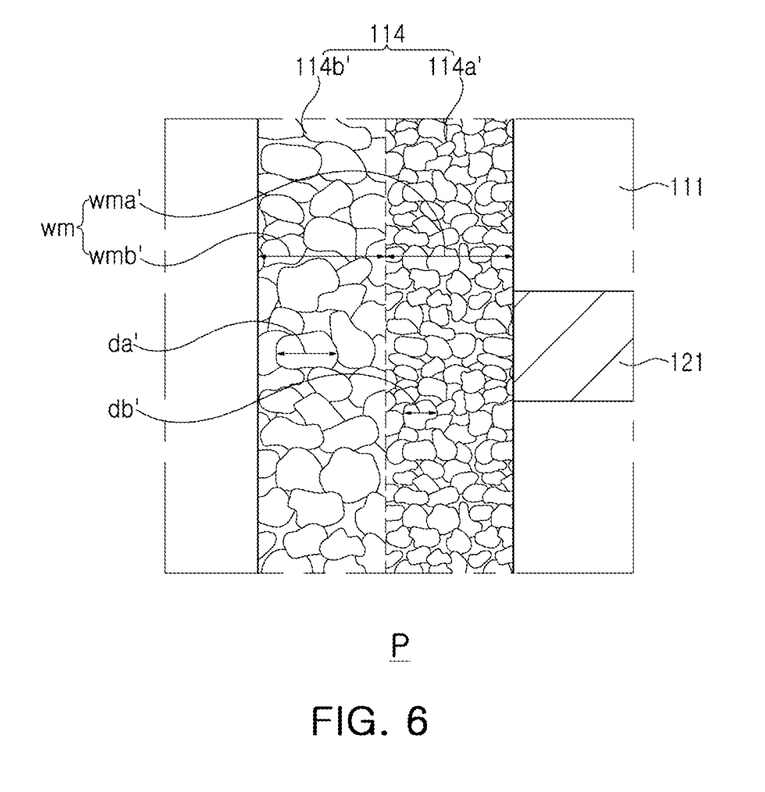
FIG. 6 is an enlarged diagram illustrating region P in FIG. 4 according to an example embodiment of the present disclosure.

FIG. 6 is an enlarged diagram illustrating region P in FIG. 4 according to an example embodiment.

Hereinafter, a multilayer electronic component according to an example embodiment will be described in greater detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body including a dielectric layer 111 and internal electrodes 121 and 122 disposed to oppose each other with the dielectric layer 111 interposed therebetween, and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction; external electrodes 131 and 132 disposed on the third and fourth surfaces 3 and 4 and connected to the internal electrodes 121 and 122; and side margin portions 114 and 115 disposed on the fifth and sixth surfaces 5 and 6, and the average content of Sn included in the side margin portions 114 and 115 may be 0.1 mol % or more and 4.0 mol % or less, and a Ba/Ti ratio of the side margin portions 114 and 115 may be greater than 1.040 and less than 1.070, and the average size of the plurality of dielectric grains included in the side margin portions 114 and 115 may satisfy 100 nm or more and 290 nm or less.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exactly hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and boundaries between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include BaTiOs ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The thickness td of the dielectric layer 111 may not be limited to any particular example.

However, to easily implement a reduced size and high capacitance of the multilayer electronic component 100, the thickness td of the dielectric layer 111 may be 0.6 μm or less, and more preferably, 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image. The average value measured as above may refer to an average size of one dielectric layer 111 in the first direction. The 30 points at equal distances may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen-printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 0.6 µm or less, and more preferably, 0.4 µm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first and second directions using a scanning electron microscope (SEM) with a magnification of 10,000. More specifically, an average value may be measured from the thicknesses of the internal electrodes 121 and 122 at 30 points spaced apart by an equal distance in the second direction in the scanned image. The average value measured as above may refer to an average size of one internal electrodes 121 and 122 in the first direction. The 30 points at equal distances may be designated in the active portion Ac. Also, when the average value is measured by extending the measurement of the average value to ten internal electrodes 121 and 122, the average thickness of the internal electrodes 121 and 122 may be further generalized. Other methods and/or tools appreciated by one of ordinary skill in the art, even if not described in the present disclosure, may also be used.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacity of multilayer electronic components, the thickness tc of the cover portions 112 and 113 may be 100 µm or less, preferably 30 µm or less. More preferably, the thickness may be 20 µm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image. The 30 points at equal distances may be designated in the upper cover portion 112. Also, when the average value is measured by extending the measurement of the average value to the lower cover portion 113, the average thickness of the cover portions 112 and 113 in the first direction may be further generalized. Other methods and/or tools appreciated by one of ordinary skill in the art, even if not described in the present disclosure, may also be used.

Meanwhile, side margin portions 114 and 115 may be disposed on both end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to a region between both ends of the first and second internal electrodes 121 and 122 in the third direction and the boundary surface of the body 110 with respect to the cross-section of the body 110 in the second and third directions.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may be formed by laminating a single dielectric layer 111 or two or more dielectric layers 111 on both end-surfaces in the third direction of the capacitance forming portion (Ac) in a third direction, respectively, and may basically prevent damages to the internal electrodes 121 and 122 due to physical or chemical stress.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

To simultaneously obtain miniaturization and high capacitance of the multilayer ceramic capacitor, internal electrodes and dielectric layers may need to have thin thicknesses and to increase the number of layers. As the number of layers increases, however, a step difference may be formed in the width direction of the internal electrodes. Such a step difference may degrade high-temperature reliability and withstand voltage properties of the multilayer ceramic capacitor. To overcome this issue, a side margin portion may be formed by attaching a margin sheet in the width direction of the internal electrode. Properties of the multilayer ceramic capacitor may improve by controlling the types and contents of materials included in a margin sheet, a binder, and a dispersant, such that that an optimal design of the side margin portion may be important.

In an example embodiment, the side margin portions 114 and 115 may include tin (Sn).

The average Sn content of the side margin portions 114 and 115 may be 0.1 mol % or more and 4.0 mol % or less, and more preferably 0.1 mol % or more and 1.0 mol % or less.

A method of measuring the content of Sn included in the side margin portions 114 and 115 may be as below.

In the case of a non-destructive method, components in dielectric grains may be analyzed at the center of the side margin portions 114 and 115 using TEM-EDS or STEM-EDS. In this case, the central region of the side margin portions 114 and 115 may be observed based on the first and third direction cross-section, and the central region of the side margin portions 114 and 115 may be observed based on the cross-section in the first and second directions. Among the cross-section of the sintered side margin portions 114 and 115, a thinned analysis sample may be prepared in a region including a dielectric using a focused ion beam (FIB) device. Thereafter, the damaged layer on the surface of the thinned sample may be removed using Ar ion milling, and mapping and quantitative analysis of each component may be performed in the image obtained using STEM-EDS. In this case, the content of elements included in a plurality of points may be measured and averaged, and the content of the elements included in the line in each position may be measured by performing a line-profile. In this case, the quantitative analysis graph of each component may be obtained and may show the mass fraction of each element, which may be represented in terms of mole fraction. Other methods and/or tools appreciated by one of ordinary skill in the art, even if not described in the present disclosure, may also be used.

Also, in the case of the destruction method, the multilayer capacitor may be pulverized, the side margin portion 114 and 115 region may be separated, and the dielectric portion may be selected, and the selected dielectric is used in an inductively coupled plasma spectrometer (ICP-OES), and by analyzing the components of the dielectric using a device such as an inductively coupled plasma mass spectrometer (ICP-MS), the content of Sn may be measured. Other methods and/or tools appreciated by one of ordinary skill in the art, even if not described in the present disclosure, may also be used.

Since the average Sn content of the side margin portions 114 and 115 satisfies 0.1 mol % or more and 4.0 mol % or less, the average size of dielectric grains may be decreased and the size distribution may be narrowed, such that due to the side margin portion 114 and 115, the moisture resistance reliability of the multilayer electronic component 100 may be improved, and grain growth properties and toughness may be changed according to the content of Sn. Accordingly, electrical properties including BDV properties of the multilayer electronic component 100 or mechanical properties including impact resistance and crack resistance may be improved.

When the average Sn content of the side margin portion 114 and 115 is less than 0.1 mol %, the average size and size dispersion of dielectric grains may increase, such that of BDV properties may deteriorate, and when the content exceeds 4.0 mol %, the sintering of the dielectric powder may not be performed or the size of the dielectric grain may be decreased, such that moisture resistance reliability and mechanical properties may be deteriorated.

In an example embodiment, the side margin portions 114 and 115 may include a barium titanate ($BaTiO_3$) ceramic material, and the Ba/Ti ratio of the side margin portions 114 and 115 may be greater than 1.040 and less than 1.070.

As the Ba/Ti ratio of the side margin portion 114 and 115 increases, grain growth of the dielectric grain included in the side margin portion 114 and 115 may be prevented, such that the average size of the dielectric grain may be decreased, and when the Ba/Ti ratio satisfies greater than 1.040 and less than 1.070, BDV properties and mechanical properties may be improved.

When the Ba/Ti ratio of the side margin portion 114 and 115 is 1.040 or less, the dielectric grain size may be large, and BDV properties may deteriorate. When the Ba/Ti ratio is 1.070 or more, dielectric grains may not be formed or the sintering density may be reduced, such that pores may be formed, and accordingly, moisture resistance and mechanical properties may be deteriorated. The Ba/Ti ratio may be determined using the methods disclosed herein. Other methods and/or tools appreciated by one of ordinary skill in the art, even if not described in the present disclosure, may also be used.

In an example embodiment, the average size of dielectric grains included in the side margin portions 114 and 115 may satisfy 100 nm or more and 290 nm or less.

Preferably, among the plurality of dielectric grains included in the side margin portions 114 and 115, dielectric grains having an average size of 100 nm or more and 290 nm or less may account for 90% or more.

For example, an arbitrary region 2 μm×2 μm of the dielectric included in the side margin portions 114 and 115 is observed through SEM with respect to the cross-section of the multilayer electronic component 100 in the first and third directions. Other methods and/or tools appreciated by one of ordinary skill in the art, even if not described in the present disclosure, may also be used. The average size of the plurality of dielectric grains observed may be 100 nm or more and 290 nm or less, more preferably, the average size of 90% or more of the plurality of dielectric grains may satisfy 100 nm or more and 290 nm or less. Here, 90% may refer to D90 indicating cumulative distribution.

In the example embodiment, the size of a dielectric grain may refer to a diameter, and the average size of a dielectric grain may refer to an average value of a minimum diameter size and a maximum diameter size passing through a center point of a dielectric grain. Also, the average size of dielectric grains may refer to a value obtained by averaging average sizes of all dielectric grains observed in a certain region.

By satisfying the average size of dielectric grains included in the side margin portion 114 and 115 of 100 nm or more and 290 nm or less, electrical properties including BDV properties, mechanical properties including crack resistance, and moisture resistance reliability may be improved.

When the average size of dielectric grains included in the side margin portion 114 and 115 is less than 100 nm, the size of dielectric grains may be small, and moisture resistance and mechanical properties may deteriorate. When the average size of dielectric grains exceeds 290 nm, the size of dielectric grains may be large and BDV properties may deteriorate.

The maximum deviation for the size of dielectric grains may satisfy ±50 nm to ±150 nm.

In the example embodiment, the deviation may be obtained by subtracting the average value from the observed value, and the maximum deviation may refer to a maximum value obtained by subtracting the average value from the observed value. That is, the size deviation may refer to a value obtained by subtracting the average size of dielectric grains included in a random region from the size of one random dielectric grain.

For example, when an arbitrary region 2 μm×2 μm in the dielectric layer 111 included in the side margin portions 114 and 115 is observed through SEM based on the cross-sections of the multilayer electronic component 100 in the first and third direction, when the average value of the average size of the entirety of observed dielectric grains may be 151 nm and the maximum deviation is ±84 nm, the size of dielectric grains observed in any region may satisfy the range of 67 nm or more and 235 nm or less.

Also, the first side margin portion 114 may include first regions 114a and 114a' adjacent to the capacitance forming portion Ac and second regions 114b and 114b' adjacent to the outer surface of the side margin portion. The average size of dielectric grains included in the first side margin portion 114 may gradually change from the first region 114a or 114a' to the second region 114b or 114b'.

For example, with respect to ½ the size of the side margin portions 114 and 115 in the third direction, when a region adjacent to the capacitance forming portion Ac is defined as a first region, and a region adjacent to the outer portion is defined as a second region, the average size of dielectric grains included in a 2 μm×2 μm region of the first region may be different from the average size of dielectric grains included in any 2 μm×2 μm region of the second region.

Here, the gradually changing size may indicate that an average value of average sizes of dielectric grains may tend to increase or decrease for every 2 μm region with respect to the third direction.

Unless otherwise indicated in the example embodiment, the description of the first side margin portion 114 may be the same as that of the second side margin portion 115, and also the description of the side margin portions 114 and 115 may include the description of the first side margin portion 114 and the second side margin portion 115.

Although the drawings of the first region and the second region of the second side margin portion 115 are not provided, the descriptions thereof may be the same as the description of the drawings of the first regions 114a and 114a' and the second regions 115a and 115a' of the first side margin portion 114, and for ease of description, reference numerals may be provided to the first regions 115a and 115a' and the second regions 115b and 115b' of the second side margin portion 115.

Referring to the example embodiment with reference to FIG. 5, the average size of dielectric grains included in the first region 114a and 115a may be equal to or greater than the average size of dielectric grains included in the second region 114b and 115b.

This may indicate that the average size of the dielectric grain may gradually decrease from the first region 114a or 115a to the second region 114b or 115b.

In this case, the average value of the average sizes da of dielectric grains included in the first regions 114a and 115a may be greater than or equal to 190 nm and less than or equal to 290 nm, and an average value of average sizes db of dielectric grains included in the second regions 114b and 115b may be 190 nm or more and 260 nm or less.

Also, the maximum deviation for the size da of dielectric grains included in the first region 114a and 115a may satisfy ±100 nm or more and ±150 nm or less, and the maximum deviation with respect to the size db of dielectric grains included in the second regions 114b and 115b may satisfy ±100 nm or more and ±120 nm or less.

When the average value of the average sizes da of dielectric grains included in the first region 114a and 115a is greater than the average value db of the average sizes db of dielectric grains in the second region 114b and 115b, cracks in the adjacent region of the capacitance forming portion Ac may be more effectively prevented, and permeation of moisture into the capacitance forming portion Ac may be prevented, such that moisture resistance reliability may be effective.

Referring to another example embodiment with reference to FIG. 6, the average value of the average sizes db' of dielectric grains included in the second region 114b' and 115b' may be equal to or greater than the average value of average sizes da' of dielectric grains included in the first region 114a' and 115a'.

This may indicate that the average size of the dielectric grain may gradually increase from the first region 114a' and 115a' to the second region 114b' and 115b'.

In this case, the average value of the average sizes da' of dielectric grains included in the first region 114a' and 115a' may be 100 nm or more and 220 nm or less, and the average value of the average sizes db' of dielectric grains included in the second regions 114b' and 115b' may be greater than or equal to 170 nm and less than or equal to 220 nm.

The maximum deviation of the dielectric grain size da' included in the first region 114a' and 115a' may be ±50 nm or more and ±110 nm or less, and a maximum deviation with respect to the size db' of dielectric grains included in the second regions 114b' and 115b' may be greater than or equal to ±80 nm and less than or equal to ±110 nm.

When the average value of the average sizes da' of dielectric grains of the first region 114a' and 115a' is less than the average value of the average sizes db' of dielectric grains of the second region 114b' and 115b', BDV properties of the multilayer electronic component 100 may be improved.

In an example embodiment, as the Ba/Ti ratio of dielectric grains included in the margin portions 114 and 115 increases, the size of dielectric grains may decrease, which may be the result of an increase in the Ba/Ti ratio as the Sn content increases, but an example embodiment thereof is not limited thereto, and the size may be implemented by controlling the Ba/Ti ratio even when the Sn content is the same.

In this case, when the Ba/Ti molar ratio is 1.04, the average size of dielectric grains included in the first region may be larger than the average size of dielectric grains included in the second region, and when the Ba/Ti molar ratio is 1.5, there may be no substantial difference between the average size of dielectric grains included in the first region and the average size of dielectric grains included in the second region. When the Ba/Ti molar ratio is 1.06, an average size of dielectric grains included in the first region may be smaller than an average size of dielectric grains included in the second region.

Even in this case, the average size of dielectric grains in each region included in the first region and the second region of the side margin portions 114 and 115 having a Ba/Ti molar ratio of 1.06 may be smaller than the average size of dielectric grains in each region included in the first region and the second region of the side margin portions 114 and 115 having a Ba/Ti molar ratio of 1.04.

In an example embodiment, the average content of Sn included in the first regions 114a, 115a, 114a', and 115a' of the margin portions 114 and 115 may be 0.1 mol % or more and 0.5 mol %, and the average content of Sn included in the second regions 114b, 115b, 114b' and 115b' of the margin portions 114 and 115 may be 0.5 mol % or more and 1.0 mol % or less.

Also, the average size wma and wma' of the first region 114a, 115a, 114a', and 115a' in the third direction may be substantially equal to or smaller than the average size wmb and wmb' of the second region 114b, 115b, 114b', and 115b' in the third direction.

By controlling the average size of the first regions 114a, 115a, 114a', and 115a' in the third direction, target properties may be varied if desired.

The width wm of the first and second side margin portions 114 and 115 may not need to be limited to any particular example.

However, to easily obtain miniaturization and high capacity of the multilayer electronic component 100, the width wm of the first and second side margin portions 114 and 115 may be 100 μm or less, and preferably 30 μm or less, and more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115 and the average size of the side margin portions 114 and 115 in the third direction.

The average thickness of the side margin portion 114 and 115 may be measured by scanning a cross-section of the body 110 in the first and third directions using a scanning electron microscope (SEM) with a magnification of 10,000.

More specifically, an average value may be measured from the thicknesses of the cover portion at 30 points spaced apart by an equal distance in the third direction in the scanned image. The 30 points at equal distances may be designated in the first side margin portion 114. Also, when the average value is measured by extending the measurement of the average value to the second side margin portion 115, the average thickness of the cover portions 112 and 113 in the first direction may be further generalized. Other methods and/or tools appreciated by one of ordinary skill in the art, even if not described in the present disclosure, may also be used.

In an example embodiment, the multilayer electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the second 121 electrodes and 122, first and internal respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include an electrode layer disposed on the body 110 and a plating layer disposed on the electrode layer.

As a more specific example of the electrode layer, the electrode layer may be a fired electrode including conductive metal and glass or a resin-based electrode including conductive metal and resin.

Also, the electrode layer may have a form in which a plastic electrode and a resin-based electrode may be formed in order on the body 110.

Also, the electrode layer may be formed by transferring a sheet including a conductive metal onto the body 110 or by transferring a sheet including a conductive metal onto a fired electrode.

The conductive metal used in the electrode layer is not limited to any particular example as long as a material which may be electrically connected to the internal electrodes 121 and 122 to form capacitance is used, and the conductive metal may include, for example, one or more selected from a group consisting of nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to the conductive metal powder and firing the paste.

The plating layer may improve mounting properties.

The type of the plating layer is not particularly limited, and may be a single plating layer including at least one of nickel (Ni), tin (Sn), palladium (Pd), and alloys thereof, or may include a plurality of layers.

For a more specific example of the plating layer, the plating layer may be a Ni plating layer or a Sn plating layer, and may have a form in which a Ni plating layer and a Sn plating layer are formed in order on the electrode layer, or a form in which a Sn plating layer, a Ni plating layer, and a Sn plating layer are formed in order. Also, the plating layer may include a plurality of Ni plating layers and/or a plurality of Sn plating layers.

Although the example embodiments have been described in detail above, the example embodiment is not limited by the above-described embodiments and the accompanying drawings, but is limited by the appended claims. Therefore, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental examples, but the scope of the present disclosure is not limited to the experimental examples.

Experimental Example

In each of the samples described below, the average Sn content included in the side margin portion satisfied 0.1 mol % or more and 4.0 mol % or less, the thickness of the side margin portion satisfied 15 µm, and the sample was formed into a multilayer electronic component having the size of 0603 (length×width, 0.6 mm×0.3 mm).

40 sample chips were manufactured for each sample, the average size, standard deviation, and coefficient of variation (CV) of the grain size of the first region of the margin portion were measured, and breakdown voltage (BDV) evaluation and moisture resistance reliability evaluation were performed.

In the BDV properties, the breakdown voltage V may refer to the voltage V at which dielectric breakdown occurred under severe conditions, and the shape parameter may be a value representing the distribution of sample chips in which dielectric breakdown occurred late. It may be indicated that the larger the size, the more sample chips in which dielectric breakdown occurred late.

Moisture resistance reliability evaluation was conducted in three stages. The first stage was conducted for 1 hour at a temperature of 40° C., a relative humidity of 85%, and a voltage of 1.2 Vr, the second stage was performed for 1 hour at a temperature of 85° C., 85% relative humidity, 1.2 Vr voltage conditions, and the third stage was performed for 2 hours under 85° C., 60% relative humidity, 0.7 Vr voltage. Among 40 sample chips, the number of sample chips in which decreased by more than $10^1 \Omega$ compared to the initial insulation resistance ($IR_0$) of $10^9 \Omega$ during the three stages was counted as defective. When the number of defective sample chips was 3 or less, the moisture resistance reliability was evaluated as excellent.

TABLE 1

| | | Size of grains in first region | | | BDV PROPERTIES | Moisture |
| Sample | Ba/Ti | Average size (nm) | Standard deviation (nm) | CV (%) | Shape parameter | resistance reliability |
|---|---|---|---|---|---|---|
| 1 | 1.041 | 269 | ±139 | 51.7 | 3.6920 | 1/40 |
| 2 | 1.052 | 216 | ±109 | 50.5 | 7.1135 | 3/40 |
| 3 | 1.056 | 188 | ±97 | 51.6 | 5.4994 | 3/40 |
| 4 | 1.061 | 165 | ±91 | 55.2 | 5.6437 | 0/40 |
| 5 | 1.064 | 121 | ±59 | 48.8 | 10.2541 | 3/40 |
| 6 | 1.070 | — | — | — | — | — |

Referring to samples 1 to 5, when the Ba/Ti ratio was greater than 1.040 and less than 1.070, it was indicated that the average size of the crystal grains in the first region was small and the standard deviation was small, and BDV properties and moisture resistance reliability were excellent.

Referring to sample 6, when the Ba/Ti ratio was 1.070, sintering was not performed, and dielectric grains were not formed properly, such that BDV properties and moisture resistance could not be confirmed.

TABLE 2

| | | Size of grains in first region | | | Size of grains in second region | | | BDV PROPERTIES |
| Sample | Ba/Ti | Average size (nm) | Standard deviation (nm) | CV (%) | Average size (nm) | Standard deviation (nm) | CV (%) | Breakdown voltage V |
|---|---|---|---|---|---|---|---|---|
| 7 | 1.040 | 270 | ±139 | 51.7 | 248 | ±119 | 48.0 | 57 |
| 8 | 1.050 | 210 | ±109 | 50.5 | 216 | ±104 | 48.1 | 62 |
| 9 | 1.060 | 151 | ±84 | 51.6 | 178 | ±94 | 52.8 | 66 |

When examining samples 7 to 9, it was indicated that the average size and standard deviation of dielectric grains decreased as the Ba/Ti ratio increased, and that BDV properties were also improved, which may be because, as the size of the dielectric grain was decreased, the movement of the electric field was intervened such that insulation breakdown was prevented.

Also, when the Ba/Ti ratio was 1.040, the size of the dielectric grain in the first region was larger than that of the second region, but when the Ba/Ti ratio was 1.050, the size of the dielectric grain was similar to the size in the first region and the second region, and when the Ba/Ti ratio was 1.060, the size of the dielectric grain was larger in the second region than in the first region.

According to the aforementioned example embodiments, BDV properties, mechanical properties, and moisture resistance reliability may be improved.

While the embodiments example have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including dielectric layers and internal electrodes alternately disposed with at least one of the dielectric layers in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
external electrodes disposed on the third and fourth surfaces and connected to the internal electrodes; and
a side margin portion disposed on the fifth and sixth surfaces,
wherein an average content of Sn included in the side margin portion is 0.1 mol % or more and 4.0 mol % or less,
wherein a Ba/Ti ratio of the side margin portion is greater than 1.040 and less than 1.070,
wherein an average size of a plurality of dielectric grains included in the side margin portion satisfies 100 nm or more and 290 nm or less, and
wherein a maximum deviation in sizes of the dielectric grains satisfies ±50 nm or more and ±150 nm or less.

2. The multilayer electronic component of claim 1,
wherein the side margin portion includes a first region adjacent to the body and a second region adjacent to an outer surface of the side margin portion, and
wherein an average size of the dielectric grains included in the side margin portion gradually changes from the first region to the second region.

3. The multilayer electronic component of claim 2, wherein an average size of dielectric grains included in the first region is greater than or equal to an average size of dielectric grains included in the second region.

4. The multilayer electronic component of claim 3, wherein the average size of the dielectric grains included in the first region is 190 nm or more and 290 nm or less, and the average size of the dielectric grains included in the second region is 190 nm or more and 260 nm or less.

5. The multilayer electronic component of claim 4, wherein a maximum deviation in sizes of the dielectric grains included in the first region satisfies ±100 nm or more and ±150 nm or less, and a maximum deviation in sizes of the dielectric grains included in the second region satisfies ±100 nm or more and ±120 nm or less.

6. The multilayer electronic component of claim 2, wherein an average size of dielectric grains included in the second region is greater than or equal to an average size of dielectric grains included in the first region.

7. The multilayer electronic component of claim 6, wherein the average size of the dielectric grains included in the first region is 100 nm or more and 220 nm or less, and the average size of the dielectric grains included in the second region is 170 nm or more and 220 nm or less.

8. The multilayer electronic component of claim 7, wherein a maximum deviation in sizes of the dielectric grains included in the first region satisfies ±50 nm or more and ±110 nm or less, and a maximum deviation in sizes of the dielectric grains included in the second region satisfies ±80 nm or more ±110 nm or less.

9. The multilayer electronic component of claim 2, wherein an average content of Sn included in the first region is 0.1 mol % or more and less than 0.5 mol %, and an average content of Sn included in the second region is 0.5 mol % or more and 1.0 mol % or less.

10. The multilayer electronic component of claim 2, wherein an average size of the first region in the third direction is less than or equal to an average size of the second region in the third direction.

11. The multilayer electronic component of claim 1,
wherein the side margin portion includes a first side margin portion disposed on the fifth surface and a second side margin portion disposed on the sixth surface, and
wherein an average size of the first and second side margin portions is 20 μm or less in the third direction.

12. The multilayer electronic component of claim 1, wherein the body includes a capacitance forming portion forming capacitance including the dielectric layers and the internal electrodes, and the body further includes a cover portion disposed on both end surfaces of the capacitance forming portion in the first direction.

13. The multilayer electronic component of claim 12,
wherein the cover portion includes an upper cover portion disposed on the second surface and a lower cover portion disposed on the first surface, and
wherein an average size of the upper and lower cover portions is 20 μm or less in the first direction.

14. The multilayer electronic component of claim 1, wherein an average size of at least one of the dielectric layers is 0.4 μm or less in the first direction.

15. The multilayer electronic component of claim 1, wherein an average size of at least one of the internal electrodes is 0.4 μm or less in the first direction.

16. A multilayer electronic component, comprising:
a body including dielectric layers and internal electrodes alternately disposed with at least one of the dielectric layers in a first direction;
external electrodes disposed on the body and connected to the internal electrodes; and
a side margin portion disposed on surfaces of the body opposing each other in a direction perpendicular to the first direction, the side margin portion includes a first region adjacent to the body and a second region adjacent to an outer surface of the side margin portion, and
wherein an average content of Sn included in the first region is 0.1 mol % or more and less than 0.5 mol %, and an average content of Sn included in the second region is 0.5 mol % or more and 1.0 mol % or less,
wherein an average size of a plurality of dielectric grains included in the side margin portion satisfies 100 nm or more and 290 nm or less, and
wherein a maximum deviation in sizes of the dielectric grains satisfies ±50 nm or more and ±150 nm or less.

17. The multilayer electronic component of claim 16, wherein a Ba/Ti ratio of the side margin portion is greater than 1.040 and less than 1.070.

18. The multilayer electronic component of claim 16, wherein an average size of the first region in the direction perpendicular to the first direction is less than or equal to an average size of the second region in the direction perpendicular to the first direction.

19. A multilayer electronic component, comprising:
a body including dielectric layers and internal electrodes alternately disposed with at least one of the dielectric layers in a first direction, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;

external electrodes disposed on the third and fourth surfaces and connected to the internal electrodes; and
a side margin portion disposed on the fifth and sixth surfaces,
wherein an average content of Sn included in the side margin portion is 0.1 mol % or more and 4.0 mol % or less,
wherein a Ba/Ti ratio of the side margin portion is greater than 1.040 and less than 1.070,
wherein an average size of a plurality of dielectric grains included in the side margin portion satisfies 100 nm or more and 290 nm or less,
wherein the side margin portion includes a first region adjacent to the body and a second region adjacent to an outer surface of the side margin portion, and
wherein an average size of dielectric grains included in the first region is greater than or equal to an average size of dielectric grains included in the second region.

* * * * *